United States Patent [19]

Beazley et al.

[11] 4,288,030
[45] Sep. 8, 1981

[54] CENTRIFUGAL SEPARATOR

[75] Inventors: Rodney T. Beazley, Downderry; Mervyn T. Haggett, Thistledovine, both of England

[73] Assignee: The Glacier Metal Company Limited, Wembley, Great Britain

[21] Appl. No.: 70,617

[22] Filed: Aug. 29, 1979

[30] Foreign Application Priority Data

Apr. 12, 1979 [GB] United Kingdom ............... 12939/79

[51] Int. Cl.³ ................................................ B04B 9/00
[52] U.S. Cl. ......................... 233/23 R; 210/DIG. 17; 210/360.1
[58] Field of Search ..................... 233/23 R, 24, 22, 2, 233/27; 210/360 R, DIG. 17

[56] References Cited

U.S. PATENT DOCUMENTS 2,799,448 7/1957 Lee ........................................ 233/24
4,106,689 8/1978 Kozulla ............................ 233/23 R

FOREIGN PATENT DOCUMENTS 1039943 9/1958 Fed. Rep. of Germany ........ 233/24

Primary Examiner—Stanley N. Gilreath
Attorney, Agent, or Firm—Pearne, Gordon, Sessions, McCoy & Granger

[57] ABSTRACT

A disposable, centrifugal separator of the kind shown, for example, in U.S. Pat. No. 4,106,689 is modified and simplified in that the rotor is made of sheet metal from which bearings are pressed out. These bearings are journaled on fixed stub axles at respective ends of the outer casing, the stub axles also preferably being of pressed out sheet metal.

11 Claims, 3 Drawing Figures

CENTRIFUGAL SEPARATOR

This invention relates to centrifugal separators, that is to say, devices for extracting solid matter from oil or other fluids or for separating a heavier fluid from a lighter fluid (for example, water from fuel oil) of the kind comprising or including a rotatable drum through which fluid is fed so that during the period when a part of the fluid remains in the drum it is subjected to centrifugal action caused by the rotation. This causes solid matter in the fluid or the heavier of the two fluids to be separated and be retained around the circumferential wall of the drum while the "cleaned" fluid is taken to where it is required for use. The drum is provided with one or more outlet nozzles through which fluid leaves the interior of the drum, the fluid issuing from the nozzles with a substantially tangential component with respect to the drum whereby the drum is caused to rotate by the reaction of the jets of fluid issuing from the nozzles. Subsequently such a centrifugal separator will be referred to as of the kind described.

The invention is particularly concerned with improvements in centrifugal separators of the kind described such that the separator is a low cost product which may be disposed of in its entirety and replaced with a new unit. Conventional centrifugal separators of the kind referred to must be dismantled for cleaning out the rotor bowl (i.e. the drum) when it is nearly full of contaminants. This cleaning process is not only tedious and dirty but involves a relatively expensive construction of rotor unit capable of being readily opened up for cleaning and readily reassembled with tightly sealed joints since this process must be repeated many times.

Conventional fluid filters, such as oil filters having paper elements, are basically mechanical strainers which include a filter element having pores which trap and segregate dirt from the fluid. Since the flow through the filter is a function of the pore size, filter flow will decrease as the filter pack becomes clogged with dirt. Since the filtration system must remove dirt at the same rate at which the dirt enters the oil, a clogged conventional paper element filter cannot process enough oil to keep the dirt level of the oil at a satisfactory level. A further disadvantage of some mechanical strainer type filters is that they tend to remove oil additives. Furthermore, the additives may be depleted to some extent by acting upon trapped dirt in the filter instead of on a working surface of an engine as intended.

Centrifugal filters have previously been proposed which do not act as mechanical strainers but rather remove contaminants from the fluid by centrifuging, so overcoming these disadvantages. For example, such a filter is shown in GB Patent No. 1,089,355 in the name of The Glacier Metal Company Limited. In this filter there is a hollow rotor which is rotatably mounted on a spindle. The spindle which extends through the rotor has axial passageways which conduct oil into the interior of the rotor. In FIG. 2 of the patent, a heavy cast base is shown with a close fitting outer casing spigotted on. In addition the rotor is a casting of considerable complication.

While centrifugal filters have an undoubtably superior performance to element type filters, their need to be cleaned out has up till now necessitated a complicated construction with relatively heavy machined castings so that it will stand up to periodic cleaning to remove the sludge built up. This has probably militated against the more universal use of centrifugal filters in engines. It has also not been possible to provide a warning system to show that the rotor bowl is full which further complicates the problem of maintenance.

It is an aim of the invention to produce a centrifugal filter which is wholly disposable after the vehicle has done a certain mileage and, at the same time, to produce a centrifugal filter very similar as regards external appearance and fitting and size to a conventional automative spin-on engine block canister filter. Clearly to be wholly disposable the filter must be of extremely simple and low cost construction avoiding expensive machined parts and keeping the number of parts to a minimum. It should also be resistant to "opening up" to prevent unauthorised attempts to clean out or reclaim the filter.

Accordingly the present invention in one aspect provides a centrifugal separator of the kind described which comprises an outer housing or shroud, and a drum or rotor mounted to rotate within the housing about two separate stub axles. Generally the stub axles will extend between the outer housing and the drum. Also, the stub axles will normally be non-rotating; however, if desired they could be carried by and rotate with the drum.

According to a further aspect of the present invention a wholly disposable centrifugal separator of the kind described comprises an outer sheet metal canister providing a shroud having spaced therefrom an inner sheet metal canister having a rotor, the inner and outer canisters both having at one end an opening, the edges of which are shaped to form in combination a bearing and journal for relative rotation of the canisters.

More particularly (though not exclusively) the invention provides a wholly disposable centrifugal separator of the kind described having an open ended rotor canister, a plate crossing the open end having tangential nozzles formed therein and a third plate attached to the internal periphery of the rotor canister and spaced from the nozzle plate thereby forming a second chamber in communication with the main rotor chamber, the rotor canister being mounted within a second canister with two separate stub axles extending between the outer canister and the rotor canister at each end thereof.

The stub axle assembly remote from the nozzles may for example be formed by pressing out a lipped aperture in the end of the second canister remote from the nozzles to form a stub axle construction cooperating with a lipped aperture pressed out from the adjacent end of the first canister.

In one particular embodiment of the invention a lower stub axle assembly at the ends of the canisters close to the nozzles may be formed by pressing out an aperture in the nozzle plate to cooperate with a rotor support ring attached to the internal surface of the second canister.

Alternatively, in another embodiment, apertures formed in the first and second canisters at both the upper and lower ends may be joined by a simple stub axle.

Thus according to yet another embodiment of the invention in a centrifugal filter of the kind referred to, the journals, stub axles or spigots for rotation of the rotor remain attached to the engine when the filter is removed. Thus the journal may be of more durable and expensive design as the expense of disposal is avoided.

The support ring referred to above, in addition to supporting and providing a bearing for the rotor, may also provide a baffle for oil leaving the nozzles and proceeding out of the second canister whereby the rotor canister may reach as high a speed as possible without drag caused by oil entering the annular space between the rotor canister and second canister.

Embodiments of the invention will now be described by way of example with reference to the accompanying diagrammatic drawings in which:

FIG. 1 shows a particular stub axle construction in which sheet metal lips on the second canister cooperate with lips on the first canister.

Figure 1:
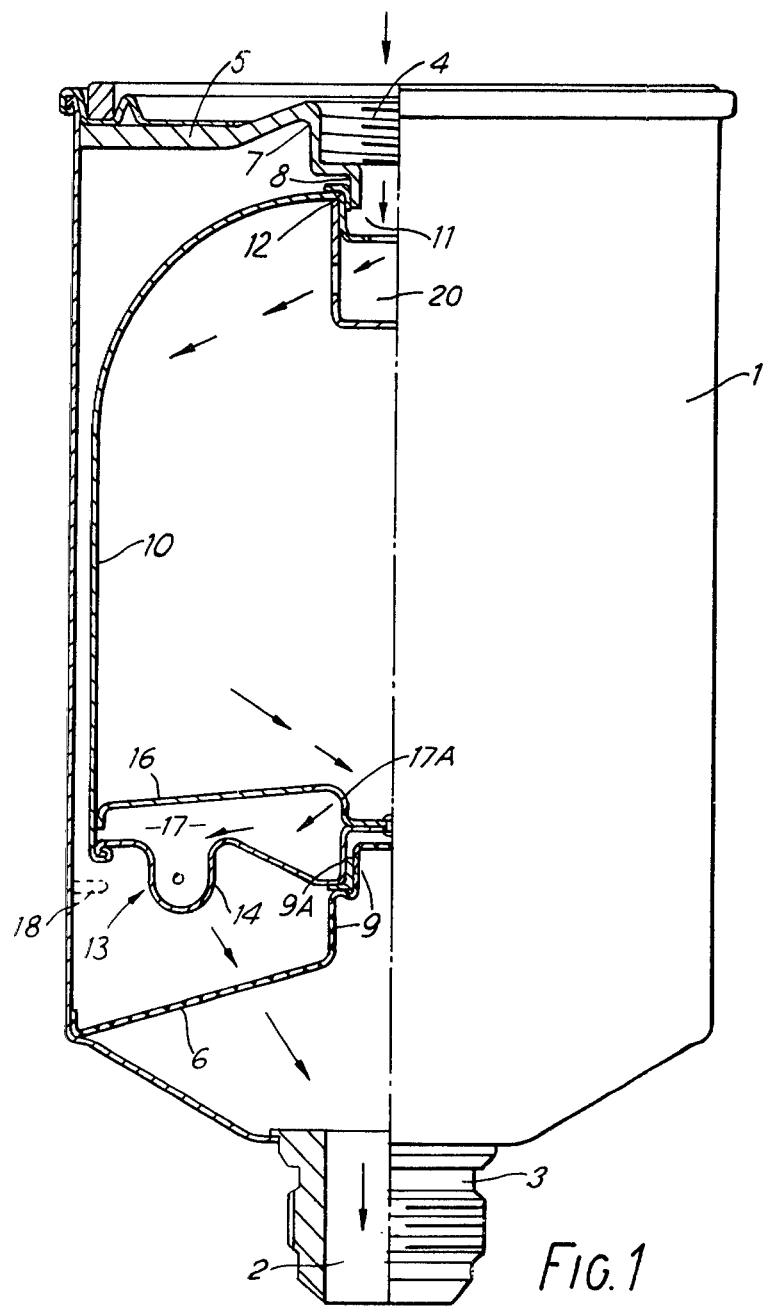
FIG. 1 is a part-sectioned elevation of one form of centrifugal separator according to the invention.

Referring now in more detail to FIG. 1 there is shown a pressed out outer canister 1 having an oil outlet 2 from which oil is led away from the separator to the engine. The union 4 is provided so that the whole centrifugal separator unit screws onto a boss on the engine in exactly the same way as the spin-on element filter conventionally used. The other end of the outer canister 1 is connected by the union 3 to an oil pipe connected to the engine. Kozulla U.S. Pat. No. 4,106,689, noted in the Abstract of the Disclosure, illustrates the mounting of a centrifugal filter of the subject type on a conventional engine block of an internal combustion engine. The outer canister 1 comprises three simple sheet metal pressings, the main canister portion 1, the top closure 5 and a rotor support cage 6, all being joined together either by the sheet metal rolled over joint technique or by simple welding or other forms of securing sheet metal together. The top closure 5 of the canister 1 has an opening 7 with a downturned extended lip 8. The rotor support cage 6 attached to the inner surface of the canister 1 is provided with an upturned lip 9. The lips 8 and 9 thus form stub axles for the rotor.

The rotor 10 is a simple pressed-out canister having an aperture 11 to communicate with the oil inlet and also having a lip 12 which cooperates with the lip 8 to form a rotary bearing and a thrust bearing. It is believed that since sufficient lubrication is available from the oil that the rotor canister may run around (or inside) the lip 8 with steel-to-steel contact without the necessity of providing a separate bearing. The adequacy of the bearing arrangement will to a large extent depend on the number of revolutions the rotor is required to undertake before the rotor becomes full of dirt. Similarly, at the lower end of the rotor canister there is a pressed out plate 13 which includes two pressed out nozzle outlets 14 (only one of which is shown). The lip 9 on the support spider 6 forms a bearing surface to run against an upturned rim 9A in the plate 13. Finally a further plate 16 spaced apart from the nozzle plate 13 provides a chamber 17 into which oil passes before entering the driving nozzles 14 to drive the rotor. This oil leaves the separator via the outlet 2 after passing through the rotor support cage (spider 6).

Since the rotor is required to rotate canister at its maximum speed for effective separation and needs to occupy the outer canister volume as fully as possible there is a tendency for oil leaving the rotor canister 10 to be driven up the relatively narrow clearance between the concentric walls of the rotor canister 10 and the outer canister 1. The rotor support cage or spider 6 if suitably apertured or shaped may constrain oil from proceeding upwardly into the clearance between the concentric sidewalls of the rotor canister 10 and the outer canister 1 while not at the same time providing a restriction to free outward flow of oil. A small lip 18 may also prove effective in this respect. An oil inlet directing chamber 20 also of pressed out sheet metal construction may be pressed into or otherwise fixed into the upper aperture 11 in the rotor 10, so that the oil will enter through the outer canister 1 through a series of radial apertures in the wall of the chamber 20 and be directed towards the outside of the rotor. The upper pair of arrows illustrated in FIG. 1 show how the oil is first directed towards the outer wall of the rotor 10 and is prevented from passing directly into the nozzle chamber 17 by the formed nozzle plate 16 before experiencing the necessary dwell time in the rotor so that efficient dirt separation can take place. It will also be noted that the oil before entering the nozzle chamber again has to migrate towards the axis of rotation before turning into the nozzle chamber 17 via holes 17A.

It is to be noted that there is no oil conveying spindle extending through the rotor; such a spindle is present in all conventional centrifugal separators of the kind described and directs the oil flow into the rotor. It has now been found that sufficient dwell time can surprisingly be obtained without the need of a oil conveying spindle extending through the rotor. It is sufficient for the oil to turn towards the outer wall of the rotor at the inlet and to turn away from the wall before it enters the nozzle chamber (see oil flow path as indicated by arrows in FIG. 1). The omission of a through spindle drastically reduces the cost of the assembly and eases "permanent" joining of the rotor canister and outer canister so that the canister assembly cannot be tampered with and leaves more space for oil in the rotor.

Figure 2:
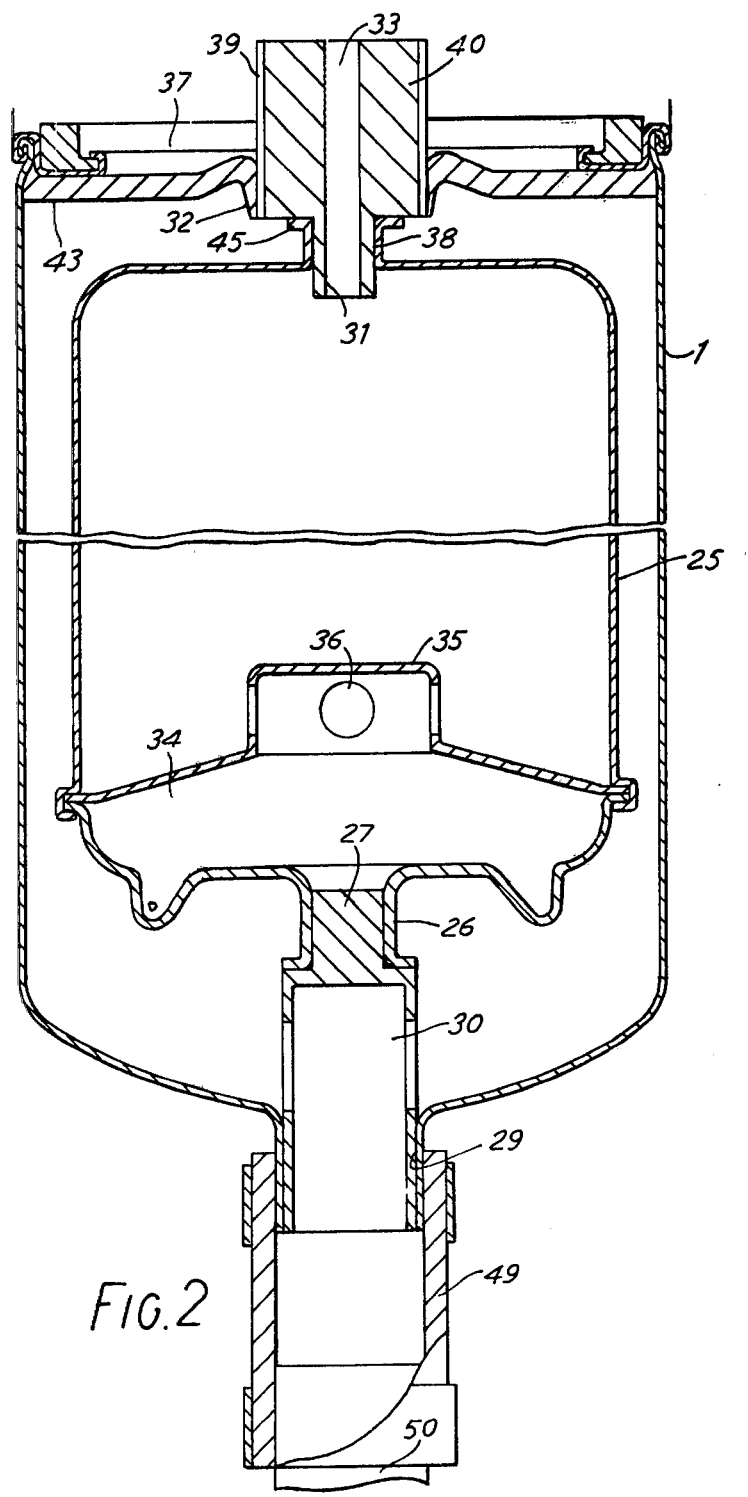
FIG. 2 is a vertical section through another form of a centrifugal separator according to the invention.

FIG. 2 shows a centrifugal filter constructions of the kind described where the stub axle assemblies still incorporate pressed lips in sheet metal but also require additional short stub axles.

Only differences from FIG. 1 will be described. The rotor canister 25 is generally similar to that shown in FIG. 1 but the lower bearing is formed by a pressed-out flange 26 in which a short stub axle 27 runs, the stub axle being fixed or pressed in the opening 29 of the outer canister. Four oil outlet holes 30 are formed in the lower, hollow, part of stub axle 27. The oil inlet has a hollow stub axle 31, the axle having a through passage 33 for the inlet of oil.

The stub axle 31 is integral with an adapter 40 having external screwthreads 39, which is secured to the engine. The upper plate 43 of the outer canister has an aperture 32 with corresponding threads to allow the filter to be screwed onto the adapter 40. The rotor 25 has a pressed out bearing aperture 38 cooperating with the stub axle 31.

A nozzle chamber 34 has a raised central portion 35 having four holes 36 in the side thereof so as to prevent oil entering the rotor from passing straight into the nozzle chamber 34 and thus giving the oil sufficient time in the rotor for effective separation of dirt.

The whole of the centrifugal filter unit can be removed from the engine, disposed of and replaced by a new unit. This operation is performed by disconnecting a flexible tube 49 clamped to the outer canister and to the engine and sliding it away from the base of the canister. The whole of the filter canister is then unscrewed from the engine adaptor 40 and stub axle 31. For assembly and transportation purposes a plastic plug with a stub axle extension is used to locate the rotor assembly in the canister at its upper end and prevent damage. This plastic plug is removed and discarded before attaching a new filter to the engine.

Figure 3:
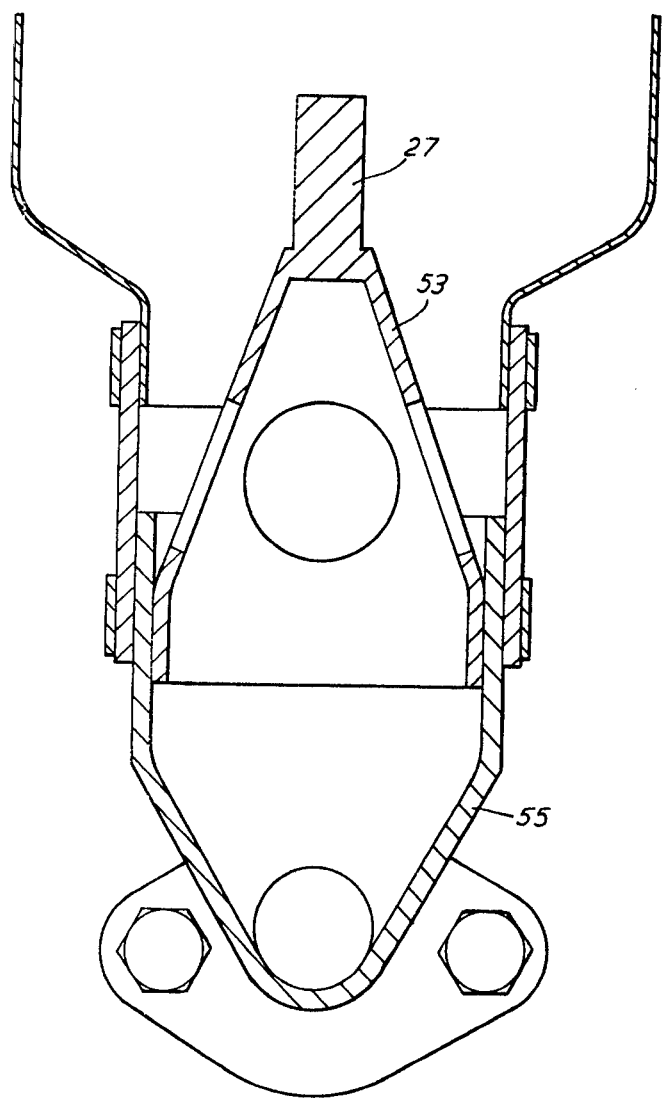
FIG. 3 is a vertical section showing a modification of the lower end of FIG. 2.

In the arrangement shown in FIG. 2 the lower stub axle assembly is thrown away with the filter. In FIG. 3 the lower stub axle assembly is rearranged. Thus with reference to FIG. 2, the flexible tube 49 can be released and lowered and the outer canister lowered so that upper bearing 38 is free of the upper stub axle spigot 31. With reference to FIG. 3, a lower stub axle spigot 27 is permanently attached to the engine by inclined spigot supports 53. Thus after the canister 1 has been dropped away from the top spigot there is sufficient room between the ends of the canister and the spigot support 53 to lift and manipulate sideways the entire canister so that it may be separated from both its spigots (stub axles) which remain attached to the engine. Another plastic plug for transport will be required for the lower end of the outer canister. If desired spigot support 53 can be screwed into member 55 to permit spigot separation.

Details of the manner in which the filter is attached to the engine oil inlets and outlets will now be described in more detail in relation to FIG. 2.

Situated on the engine is a filter mounting plate which has a through hole leading into the oil circuit. Screwed into this threaded hole is the adaptor 40 threaded on the outside at 39 and through which the passage 33 passes. At the end of and concentric with the threaded portion 39 is the integral cylindrical spigot 31 which forms the upper journal or stub axle about which the filter rotor rotates. The adaptor 40 and integral spigot 31 are manufactured from bronze or other suitable bearing material. The screwed section of the adaptor 40 fits into the engine at one end and also secures the outer canister to the engine via its top closure 43, a conventional seal 37 being provided as illustrated in earlier noted U.S. Pat. No. 4,106,689.

The rotor canister has a flanged upper lipped surface 45. The spigot 31 and lipped ring 38 form a stub axle bearing assembly. During operation the upper flange 45 is in contact with the bottom face of the adaptor 40 thus forming a thrust bearing. The rotor rotates about the spigot 31 so that its cylindrical surface 38 acts as a journal bearing.

The nozzle chamber 34 is defined in part by a pressed base component containing the two jets, a central flanged cylindrical surface 26 of which forms the lower bearing surface of the rotor concentric with the upper bearing arrangement. The flange 26 rotates about the spigot 27 which is manufactured from bronze or other bearing material and which has a shoulder acting as a lower thrust bearing. The spigot 27 also forms the lower journal bearing. The tube 49 connects the canister to a flange pipe 50 mounted on the engine sump.

In all embodiments of the invention, it may be desirable to provide a pressure relief valve in the upper part of the outer canister to release excess air pressure to atmosphere.

The following modifications of the FIG. 1 embodiment may also be advantageous (a) the provision of a horizontal annular oil deflector plate extending outwards from the base of chamber 20 e.g. to approximately half the radius of the rotor. (b) the provision of a solid spigot or stub shaft at the lower bearing point. (c) heat-hardening of bearing surfaces provided by pressed metal.

Desirably the spinning rotor should be in vertical equilibrium so that there is little or no resultant force acting on the upper or lower thrust bearings. In the FIG. 1 embodiment this may be aided by providing a bleed opening in the centre of the lower rotor wall to connect the main rotor chamber with the space above the lower stub axle or spigot. Such a bleed arrangement, besides effecting some measure of pressure balancing, will also facilitate lubrication of the lower bearing.

What is claimed is:

1. In a disposable centrifugal separator for separating contaminants from oil used for lubricating an engine, said separator comprising shroud means defining a first chamber, bearing means within the shroud means, a hollow rotor rotatably carried by the bearing means, said hollow rotor defining a second chamber for receiving contaminated oil, inlet port means in said shroud means said port means being aligned with said bearing means and adapted to form a releasable connection with said engine, an inlet passage passing through said bearing means and connecting said inlet port means to said second chamber, means to rotate said rotor and thereby cause contaminants in the contaminated oil within said second chamber to migrate towards the sidewall of said second chamber under the influence of centrifugal force and to be separated from such contaminated oil, said means to rotate said rotor comprising outlet reaction port means on said rotor in fluid communication with said second chamber to cause said rotor to rotate upon discharge of fluid from said second chamber to said first chamber, partition means in said second chamber adjacent said outlet port reaction means dividing said second chamber into a centrifuging chamber and an outlet port chamber, said centrifuging chamber and said outlet port chamber being interconnected adjacent the rotary axis of the rotor, and outlet port means in said shroud means for discharging fluid from said first chamber, said outlet port means being adapted to form a releasable connection with said engine, the improvement which comprises forming said bearing means as axially aligned stub axles and leaving said centrifuging chamber substantially unrestricted whereby oil entering said centrifuging chamber through said inlet passage immediately flows outwardly towards said sidewall under centrifugal force.

2. A centrifugal separator according to claim 1, wherein the stub axles are fixedly mounted at the respective ends of the shroud means.

3. A centrifugal separator according to claim 2, wherein the rotor has annular recesses at its respective ends, said recesses being journalled on said stub axles.

4. A centrifugal separator according to claim 3, wherein the rotor is of sheet metal and the bottoms of the recesses are substantially closed to strengthen the rotor.

5. A centrifugal separator according to claim 4, wherein the stub axles are of sheet metal.

6. A centrifugal separator according to claim 5 wherein the bearings are formed by direct sheet metal to sheet metal engagement.

7. A centrifugal separator according to claim 1, wherein the recess at the inlet end of the rotor has a partition providing a fluid distribution chamber at its inward end, said partition providing a peripheral wall for the fluid distribution chamber, said peripheral wall being provided with radial exit ports.

8. A centrifugal separator according to claim 1, wherein the rotor is of sheet metal.

9. A centrifugal separator according to claim 1, wherein at least one of said stub axles is attached to a mounting for said separator and is readily removable from said shroud means.

10. A centrifugal separator according to claim 1, wherein said partition means cooperates with the sidewall to provide a peripheral channel at the lower end of said centrifuging chamber.

11. A centrifugal separator according to claim 1, wherein said partition means slopes downwardly in the radially outward direction.

* * * * *